Oct. 5, 1926.  
H. R. JOHNSON  
1,601,859  
PORTABLE POWER SAW  
Filed Feb. 19, 1925    3 Sheets-Sheet 1

Inventor  
Herman R. Johnson  
By his Attorneys

Oct. 5, 1926.

H. R. JOHNSON 1,601,859

PORTABLE POWER SAW

Filed Feb. 19, 1925      3 Sheets-Sheet 2

Inventor
Herman R. Johnson
By his Attorneys

Oct. 5, 1926.

H. R. JOHNSON 1,601,859

PORTABLE POWER SAW

Filed Feb. 19, 1925    3 Sheets-Sheet 3

Inventor
Herman R. Johnson
By his Attorneys
Merchant and Kenyon

Patented Oct. 5, 1926.

1,601,859

UNITED STATES PATENT OFFICE.

HERMAN R. JOHNSON, OF MINNEAPOLIS, MINNESOTA.

PORTABLE POWER SAW.

Application filed February 19, 1925. Serial No. 10,273.

My invention relates to portable power saws and has for its object to improve the same in the several particulars hereinafter noted.

To the above end, generally stated, the invention consists of the novel devices and combinations of devices hereinafter described and defined in the claims.

In the accompanying drawings, which illustrate the invention, like characters indicate like parts throughout the several views.

Referring to the drawings.

Figure 1:
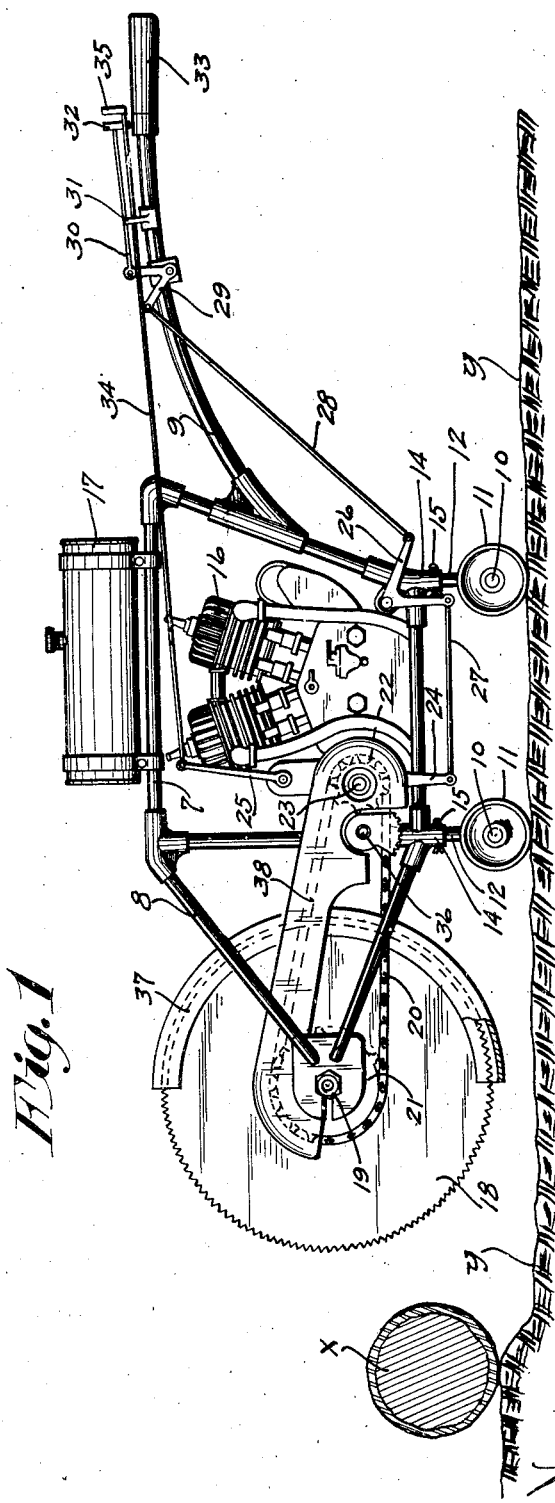
Fig. 1 is a left side elevation of the portable power saw and also showing a log in section.

The numeral 7 indicates a trussed frame formed from tubes and having a front fork 8 and a pair of rearwardly projecting handle bars 9, and which frame and fork are fashioned somewhat after correspondingly formed parts of a motorcycle. This frame 7 is mounted on a main running gear comprising front and rear fixed axles 10 on which are journaled front and rear pairs of wheels 11. Posts 12 are rigidly secured to the axles 10, extend into depending pockets 14 in the frame 7, and support said frame. Cotter pins 15 are extended through aligned bores in the walls of the pockets 14 and the posts 12 and detachably secure said frame to the running gear.

An internal combustion engine, which may be of the motorcycle type or any other suitable type, is indicated as an entirety by the numeral 16 and is mounted within the frame 7. Mounted on the top bar of the frame 7 is a supply tank 17 for holding liquid fuel for the engine 16. A vertically disposed circular saw 18 is mounted on an arbor 19 secured in the front fork 8 and is driven from the engine 16 by the following connections, to wit: a sprocket chain 20 runs over a relatively large sprocket wheel 21 on the arbor 19 and a relatively small sprocket wheel 22 which is loosely mounted on a transverse shaft 23 and is arranged to be connected thereto, at will, by a clutch, only the operating lever 24 of which is shown. This shaft 23 is connected to the engine shaft by a gear shift, only the lever 25 of which is shown. Such a clutch and gear shift are of well known construction and for the purpose of this case it is not thought necessary to illustrate the same.

The clutch lever 24 is operated, at will, by the following connections, to wit: a bell crank 26 is mounted on the frame 7, and one of its arms is connected to said clutch lever by a link 27 and the other arm is connected by a link 28 to one of the arms of a bell crank 29 mounted on the left-hand handle bar 9. Attached to the other arm of the bell crank 29 is a rearwardly projecting link 30 mounted in a guide 31 on said handle bar 9 and having an upturned hand piece 32 closely associated with a handle piece 33 on said handle bar. The gear shift lever 25 is operated by a long link 34 which extends through the guide 31 on the left-hand handle bar 9 and has an upturned handle 35 closely associated with the respective hand piece 33.

The starter for the engine 16 is indicated as an entirety by the numeral 36. The saw 18 is provided with a guard 37 and the sprocket chain 20 is provided with a guard 38.

The portable power saw, as shown in Fig. 1, is adapted to transversely cut a log X laying on the ground Y. To make such a cut, the saw 18 is fed to its work by the operator taking hold of the hand piece 32 and 33 and pushing the portable power saw toward the log X. In case it is necessary to raise the saw 18 to make such a cut, it is only necessary for the operator to push downward on the handle bars 9 to lift the front wheels 11 from the ground and move the device on the rear wheels 11. If it is necessary to lower the saw 18, the operator lifts the handle bars 9 to lift the rear wheels from the ground and cause the device to travel on the front wheels 11.

Figure 3:
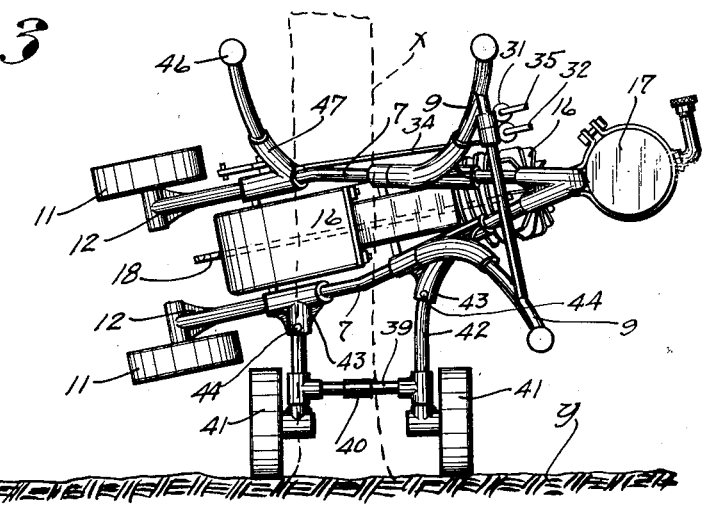
Fig. 3 is a rear elevation of the portable power saw mounted on its supplemental running gear and diagrammatically illustrating, by means of dotted lines, the trunk of a tree.
Figure 4:
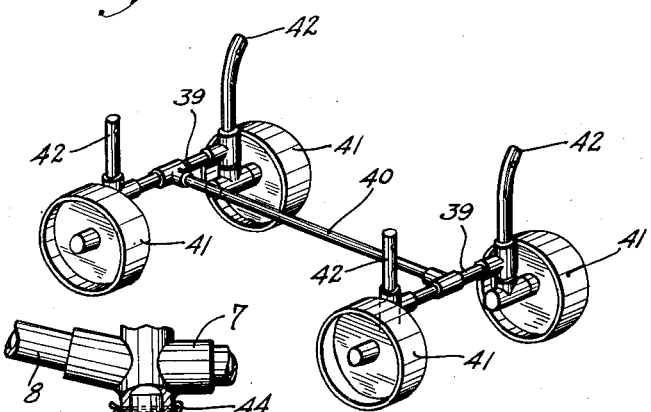
Fig. 4 is a perspective view of the supplemental running gear.
Figure 5:
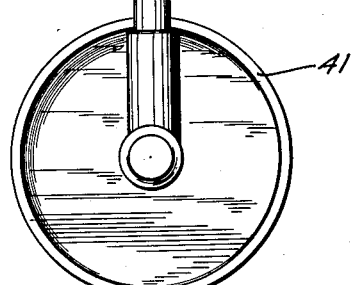
Fig. 5 is a side elevation of the left front wheel of the supplemental running gear and a fragment of the frame supported therefrom.

To mount the portable power saw so that its saw 18 will cut in substantially a horizontally plane, I provide a supplemental running gear, which adapts the device for use in cutting down trees or cutting off stumps, the trunk Z of a tree being indicated in Fig. 3 by means of broken lines. This supplemental running gear comprises fixed front and rear axles 39 connected by a tie bar 40 and on which are journaled front and rear pairs of wheels 41. Front and rear pairs of posts are rigidly secured to the axles 39 and arranged to be removably mounted in pockets 43 formed with certain of the uprights of the frame 7 on the right side thereof and support the device as shown in Fig. 3. Cotter pins 44 are inserted through aligned bores in the posts 42 and walls of the pockets 43 and detachably secure the supplemental running gear to the frame 7. When the supplemental running gear is secured to the frame 7, it is only necessary to turn the device on its longitudinal axis to bring either of the wheels of the main and supplemental running gears onto the ground so that the saw 18 may be very quickly positioned to either transversely cut a log or saw down a tree or cut off a stump.

Figure 6:
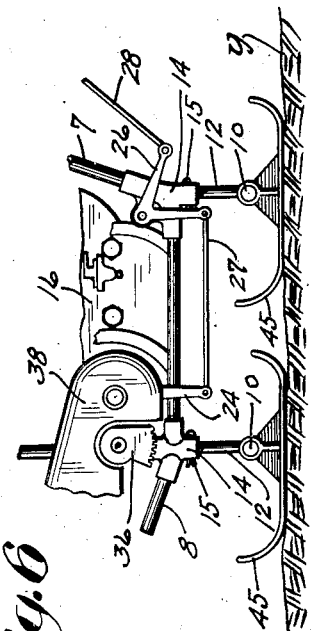
Fig. 6 is a fragmentary view of the portable power saw as shown in Fig. 1, with the exception that the wheels have been removed and runners substituted therefor.
Figure 2:
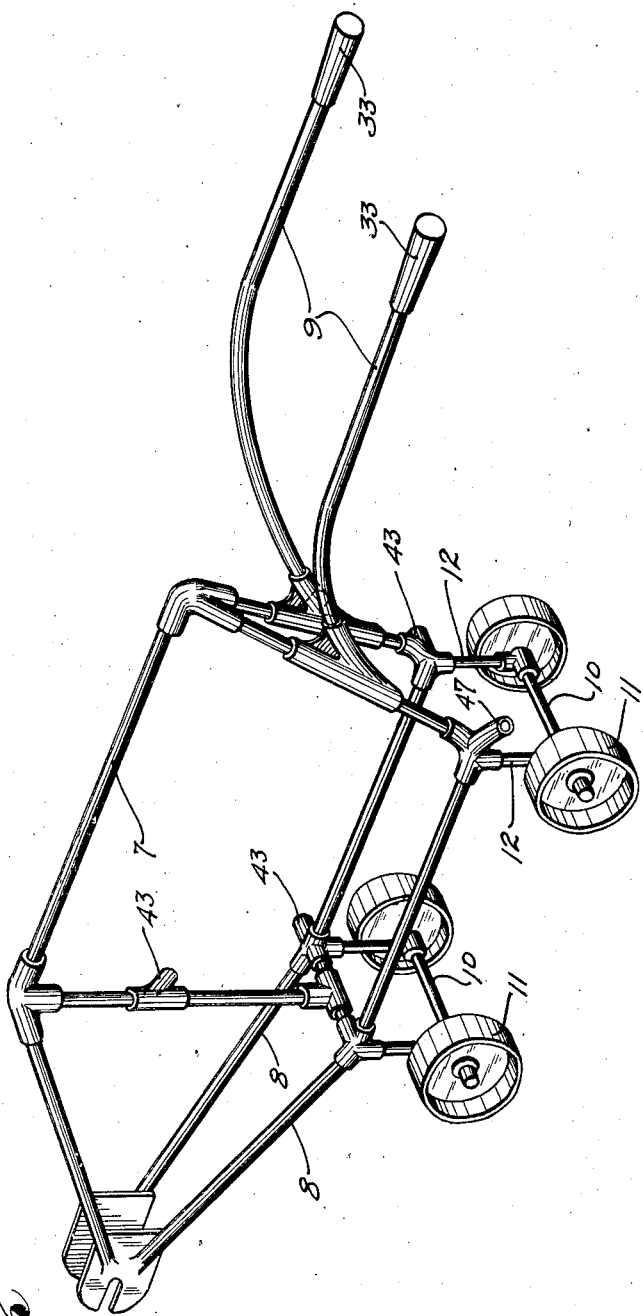
Fig. 2 is a perspective view of the frame and main running gear.

When snow is on the ground, the wheels from the running gears may be removed and runners 45 substituted therefor, as shown in Fig. 6, and which runners are loosely mounted on the respective axles so that the device may be moved on either the front or rear pairs of runners for lowering or raising the saw 18.

When the device is mounted on the supplemental running gear I provide a detachable supplemental handle bar 46 mounted in a socket 47 on one of the uprights of the frame 7 to be used in connection with the left-hand handle bar 9.

What I claim is:

1. A portable saw comprising a frame, a running gear including front and rear pairs of runners on which said frame is mounted, and a saw journaled on the frame and spaced above the ground, said frame being adapted to be longitudinally tilted on either the front or rear pairs of runners to lift the other pair of runners off the ground and permit the frame to be moved forward on the ground-engaging pair of runners to feed the saw to its work and at the same time raise or lower the saw.

2. A portable power saw comprising a running gear, a frame mounted on the running gear and having a pair of laterally spaced forks projecting forward of the running gear, a saw mounted between said forks and journaled thereon, said fork supporting the saw above the ground, a motor on the frame for driving the saw, and a pair of handle bars on the frame projecting rearward of the running gear, said frame adapted to be tilted longitudinally on the running gear by raising or lowering the handle bars to impart a reverse movement to the saw.

3. A portable power saw comprising a frame, a saw journaled on the frame, a motor mounted on the frame for driving the saw, a main running gear on which said frame is mounted, and a supplemental running gear having posts, said frame having pockets arranged to receive said posts for securing the frame to the supplemental running gear, said frame being shiftable to bring either of said running gears onto the ground for angularly adjusting the saw for cutting in different planes.

4. A portable power saw comprising a frame, a saw journaled on the frame, a motor mounted on the frame for driving the saw, and laterally spaced main and supplemental running gears on the frame, either of said running gears being arranged to be brought onto the ground by tilting the frame laterally to turn the saw on its longitudinal axis for cutting in different planes, said supplemental running gear being detachably secured to the frame.

5. The structure defined in claim 3 in which said posts are detachably secured to said pockets.

6. A portable power saw comprising a frame, a saw journaled on the frame, a motor mounted on the frame for driving the saw, laterally spaced main and supplemental running gears on the frame, either of said running gears being arranged to be brought onto the ground by tilting the frame laterally to turn the saw on its longitudinal axis for cutting in different planes, and a supplemental handle bar for the frame.

7. A portable power saw comprising a frame, a saw journaled on the frame, a motor mounted on the frame for driving the saw, laterally spaced main and supplemental running gears on the frame, either of said running gears being arranged to be brought onto the ground by tilting the frame laterally to turn the saw on its longitudinal axis for cutting in different planes, and a detachable supplemental handle bar for the frame.

In testimony whereof I affix my signature.

HERMAN R. JOHNSON.